United States Patent [19]

Drexler

[11] 4,360,728
[45] Nov. 23, 1982

[54] BANKING CARD FOR AUTOMATIC TELLER MACHINES AND THE LIKE

[75] Inventor: Jerome Drexler, Los Altos Hills, Calif.

[73] Assignee: Drexler Technology Corporation, Mountain View, Calif.

[21] Appl. No.: 238,832

[22] Filed: Feb. 27, 1981

[51] Int. Cl.³ .................. G01D 15/02; G11B 23/30; G06K 5/00

[52] U.S. Cl. ................... 235/462; 346/76 L; 235/493

[58] Field of Search ............ 235/462, 493, 440, 487, 235/454; 346/77 E, 76 L; 365/124

[56] References Cited

U.S. PATENT DOCUMENTS

| | | | |
|---|---|---|---|
| 3,761,683 | 9/1973 | Rogers | 235/440 |
| 3,858,031 | 12/1974 | Kornfeld | |
| 3,876,981 | 4/1975 | Welch | 235/440 |
| 3,921,318 | 11/1975 | Calavetta | 235/493 |
| 3,995,280 | 11/1976 | Lo et al. | 346/77 E |
| 4,029,944 | 6/1977 | Trenkamp et al. | 235/440 |
| 4,034,211 | 7/1977 | Horst et al. | 235/454 |
| 4,041,279 | 8/1977 | Foote | 235/440 |
| 4,056,712 | 11/1977 | Trenkamp et al. | 235/440 |
| 4,150,781 | 4/1979 | Silverman et al. | 235/493 |
| 4,209,804 | 6/1980 | Dil | 235/487 |
| 4,270,130 | 5/1981 | Houle et al. | 346/77 E |

OTHER PUBLICATIONS

J. E. Rohen, et al., "Dual-Stripe Magnetic Card," IBM Technical Disclosure Bulletin, vol. 22, No. 12, May 1980, p. 5298.

Primary Examiner—Donald J. Yusko

[57] ABSTRACT

A data card having a pair of spaced apart information records. One record is a strip of high resolution reflective laser recording material, such as a metallic film. The other strip is a magnetic recording material. The strip of laser recording material has a capacity for recording at least 250,000 bits represented by pits having a dimension less than 50 microns.

14 Claims, 6 Drawing Figures

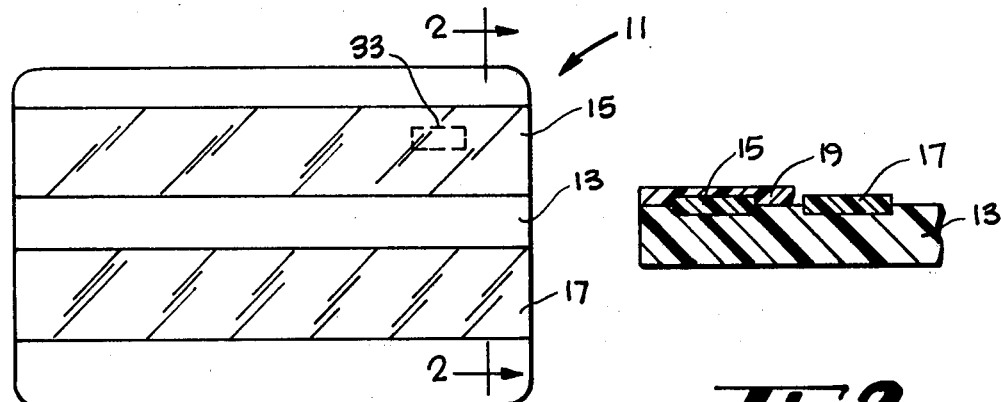
Fig. 1
Fig. 2
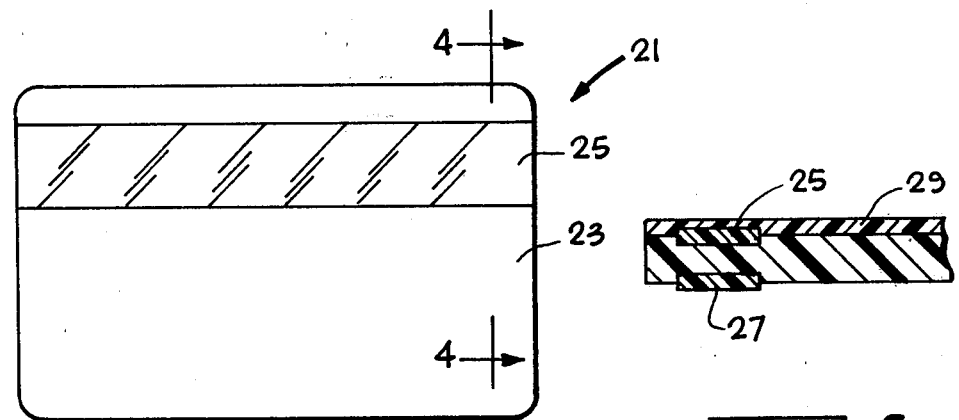
Fig. 3
Fig. 4
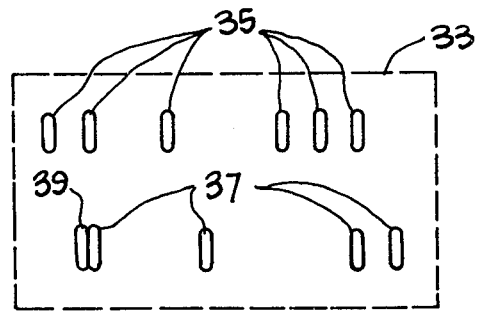
Fig. 5

BANKING CARD FOR AUTOMATIC TELLER MACHINES AND THE LIKE

DESCRIPTION

1. Technical Field

The invention relates to personal identification cards and more particularly to a data card which can be used in an automatic teller machine and the like.

2. Background Art

In metropolitan areas, electronic fund transfer systems allow bank customers to transact business at all hours of the day and from many locations. However, one of the problems which is encountered is with security. Normally, a bank has centralized data processing and all automatic teller machines (ATMs) are linked to this computer (CPU) by dedicated communication lines, such as telephone or microwave links.

Frequently, for purposes of security, the ATM is installed within the walls of the bank. This is done for two reasons. First, the ATMs have a lot of money. Second, access to the ATMs is strictly controlled, including access to the communication links. Thus, there is not only a requirement for physical security on account of the money involved, but there is also a requirement for communications security because communication devices grant access to the money. It is widely recognized that communications security is one of the weak links in ATM banking. In order to improve communications security, most banks have adopted data encryption between the ATM and the CPU. The problem with data encryption is that it makes system maintenance more complicated and makes the ATM machines themselves more cumbersome. Furthermore, a new security problem is created, namely security for the encryption system. The security for the cryptographic devices must be almost as great as for the ATM itself, since these devices contain the clear data. A solution is to build such devices into the ATM so that data emerging from the ATM is encrypted.

While encrypted ATMs are now used in large metropolitan areas, electronic fund transfer systems are not used in smaller isolated communities where a communications link to the CPU in a metropolitan area is quite expensive and in many instances prohibit use of ATMs. Many such communities still use modernized versions of paper passbook banking and for the foreseeable future it appears that this method of banking will remain as the primary method of doing banking business. In these communities, as well as in metropolitan areas, it would be desirable to revert to more simplified ATMs, namely ones without expensive telecommunications links to a CPU which require data encryption devices. Accordingly, it was an object of the invention to devise a banking card for facilitating electronic passbook banking in cooperation with an ATM, not connected to a remote CPU and without an external data encryption system.

DISCLOSURE OF INVENTION

The above objects have been met with a high information capacity data card for use with a card reader associated with ATMs and similar devices. The data card is a wallet-size card, such as a credit card with two data strips on the card, preferably parallel to the lengthwise dimension of the card. The first strip comprises a high resolution, high capacity, reflective laser recording material. The second strip consists of a magnetic recording material which is parallel, but spaced apart from, the first strip. The laser recording material is intended as a record for passbook banking. In other words, a passbook type of record will be contained on the first strip, with all deposits, withdrawals, interest payments and service charges. This data can be entered by an ATM which reads the strip for user identification and current data, then updates the current data with laser writing.

One of the chief advantages of the present invention is the high information capacity of laser recording media strips. Typically, high resolution laser recording materials record pits having dimensions on the order of several microns or tens of microns. A high capacity laser recording material strip enables a credit card to carry the equivalent of scores of pages of text, more than ample for passbook banking applications, identification and similar uses. Moreover, the magnetic strip on the same card provides compatibility with existing equipment not having laser writing and reading capability, backup in the event of failure of the optical system and extra security for verification of user access.

BRIEF DESCRIPTION OF DRAWINGS

FIG. 1 is a plan view of one side of a data card in accord with the present invention;

FIG. 2 is a partial side sectional view taken along lines 2—2 in FIG. 1;

FIG. 3 is a plan view of one side of an alternate embodiment of a data card in accord with the present invention;

FIG. 4 is a partial side sectional view taken along lines 4—4 in FIG. 3.

FIG. 5 is a detail of laser writing on a portion of the laser recording strip illustrated by dashed lines in FIG. 1.

BEST MODE FOR CARRYING OUT THE INVENTION

Figure 6:
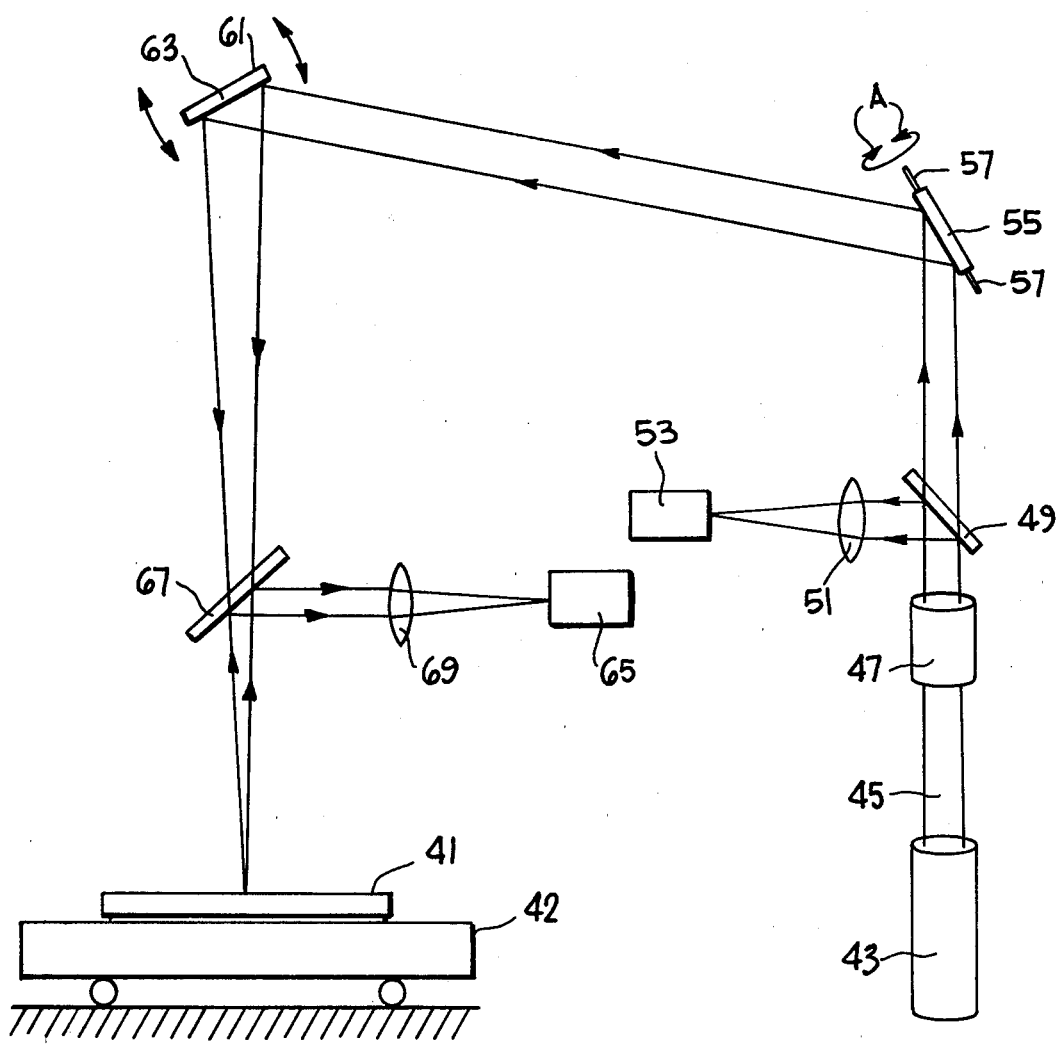
FIG. 6 is a plan view of an apparatus for reading and writing on the optical recording media strip illustrated in FIGS. 1 and 3.

With reference to FIGS. 1 and 2, a data card 11 is illustrated having a size common to most credit cards. The width dimension of such a card is approximately 54 mm and the length dimension is approximately 85 mm. These dimensions are not critical, but preferred because such a size easily fits into a wallet and has historically been adopted as a convenient size for automatic teller machines and the like. The card's base 13 is a dielectric, usually a plastic material such as polyvinyl chloride or similar material. The surface finish of the base should have low specular reflectivity, preferably less than 10%. Base 13 has a pair of shallow grooves which carry first and second strips 15 and 17, respectively. The strips are each about 15 millimeters wide and extend the length of the card parallel to each other and spaced by a few millimeters. Alternatively, the first strip may have a different size and orientation than the second strip. The strips are relatively thin, approximately 100–500 microns, although this is not critical. The strips may be applied to the card by any convenient method which achieves flatness. An automated method for installing magnetic strips is described in U.S. Pat. No. 4,231,828. The two strips are adhered to the card with an adhesive and covered by a transparent laminating sheet 19 which serves to keep strip 15 flat, as well as protecting the strip from dust and scratches. Sheet 19 is a thin, transparent plastic sheet laminating material or a coating, such as a transparent laquer. Sheet 19 covers only the first strip and not the second strip.

The opposite side of base 13 may have user identification indicia embossed on the surface of the card. Other indicia such as card expiration data, card number and the like may be optionally provided.

The high resolution laser recording material which forms strip 15 may be any of the reflective recording materials which have been developed for use as direct read-after-write (DRAW) optical disks, so long as the materials can be formed on thin substrates. An advantage of reflective materials over transmissive materials is that the read/write equipment is all on one side of the card and automatic focus is easier. For example, the high resolution material described in U.S. Pat. No. 4,230,939 issued to de Bont, et al. teaches a thin metallic recording layer of reflective metals such as Bi, Te, Ind, Sn, Cu, Al, Pt, Au, Rh, As, Sb, Ge, Se, Ga. Materials which are preferred are those having high reflectivity and low melting point, particularly Cd, Sn, Tl, Ind, Bi and amalgams. Suspensions of reflective metal particles in organic colloids also form low melting temperature laser recording media. The laser recording material which is selected should be compatible with the laser which is used for writing on it. Some materials are more sensitive than others at certain wavelengths. Good sensitivity to infrared light is preferred because infrared is affected least by scratches and dirt on the transparent laminating sheet. The selected recording material should have a favorable signal-to-noise ratio with the read/write system with which it is used. A large number of highly reflective laser recording materials have been used for optical data disk applications. Reflectivity should be at least 15% and preferably greater than 25%. Reflectivity of about 50% is preferred with reflectivity of a pit in the reflective material being less than 10%.

With reference to FIGS. 3 and 4, a card 21 is shown, having a plastic base 23, similar to base 13 in FIG. 1. The card 21 has opposed first and second strips 25 and 27 adhered thereto with transparent laminating sheet 29 covering the base, as well as the strip 25, holding it securely in place. The first strip 25 is a high resolution laser recording material, corresponding to strip 15 in FIG. 1, while the second strip 27 is a magnetic recording material, corresponding to strip 17 in FIG. 1. The card of FIGS. 3 and 4 is essentially the same as the card of FIGS. 1 and 2 except for the manner in which the two strips are arranged. In FIG. 1, the strips are on the same side of the card so that all reading and writing transducers can be located on the same side of the card, while in FIG. 3, optical transducers must be located on one side of the card and magnetic transducers on the opposite side of the card for reading and writing thereon.

With reference to FIG. 5, a magnified view of laser writing on the laser recording material strip 15 may be seen. The dashed line 33, corresponds to the dashed line 33 in FIG. 1. The oblong pits 35 are aligned in a path and have generally similar dimensions. The pits are generally circular or oval in shape with the axis of the oval perpendicular to the lengthwise dimension of the strip. A second group of pits 37 is shown aligned in a second path. The pits 37 have similar dimensions to the pits 35. The spacing between paths is not critical, except that the optics of the readback system should be able to easily distinguish between paths.

Presently, in optical disk technology, paths which are separated by only a few microns may be resolved. The spacing and pattern of the pits along each path is selected for easy decoding. For example, oval pits of the type shown can be clustered and spaced in accord with self-clocking bar codes. If variations in the dimensions of a pit are required, such dimensions can be achieved by clustering pits, such as the double pit 39. Such variations are used in the ETAB bar code which is described in U.S. Pat. No. 4,245,152. While the American Bankers' Association has not yet adopted any particular code, the strip material is such that many machine and eye readable codes can be accommodated. Some optical codes such as the Universal Product Code are both machine and eye readable. Such codes could also be accommodated, although a great deal more laser writing would be required, than with circular or oval pits, and a much lower information density would be achieved. The pits illustrated in FIG. 5 have a recommended size of approximately 5 microns by 20 microns, or circular pits 5 microns or 10 microns in diameter. Generally, the smallest dimension of a pit should be less than 50 microns. In the preferred embodiment the largest dimension would also be less than 50 microns. Of course, to offset lower densities from larger pits, the size of the strip 15 or 25 could be expanded to the point where it covers a large extent of the card. In FIG. 3, the laser recording strip 25 could completely cover a single side of the card. A minimum information capacity of 250,000 bits is indicated and a storage capacity of over one million bits is preferable.

In FIG. 6, a side view of the lengthwise dimension of a card 41 is shown. The card is usually received in a movable holder 42 which brings the card into the beam trajectory. A laser light source 43, preferably a pulsed semiconductor laser of infrared wavelength emits a beam 45 which passes through collimating and focussing optics 47. The beam is sampled by a beam splitter 49 which transmits a portion of the beam through a focusing lens 51 to a photodetector 53. The detector 53 confirms laser writing and is not essential. The beam is then directed to a first servo controlled mirror 55 which is mounted for rotation along the axis 57 in the direction indicated by the arrows A. The purpose of the mirror 55 is to find the lateral edges of the laser recording material in a coarse mode of operation and then in a fine mode of operation identify data paths which exist predetermined distances from the edges.

From mirror 55, the beam is directed toward mirror 61. This mirror is mounted for rotation at pivot 63. The purpose of mirror 55 is for fine control of motion of the beam along the length of the card. Coarse control of the lengthwise position of the card relative to the beam is achieved by motion of movable holder 42. The position of the holder may be established by a linear motor adjusted by a closed loop position servo system of the type used in magnetic disk drives. Reference position information may be prerecorded on the card so that position error signals may be generated and used as feedback in motor control. Upon reading one data path, the mirror 55 is slightly rotated. The motor moves holder 41 lengthwise so that the path can be read, and so on. As light is scattered and reflected from the pits, the reflectivity of the beam changes relative to surrounding material where no pits exist. The beam should deliver sufficient laser pulse energy to the surface of the recording material to create pits. Typically, 5–10 milliwatts is required, depending on the recording material. The wavelength of the laser should be compatible with the recording material. In the read mode, power is lowered to about 5% of the record power.

Differences in reflectivity between a pit and surrounding material are detected by light detector 65 which may be a photodiode. Light is focussed onto detector 65 by beam splitter 67 and focusing lens 69. Servo motors, not shown, control the positions of the mirrors and drive the mirrors in accord with instructions received from control circuits, as well as from feedback devices. The detector 65 produces electrical signals corresponding to pits. These signals are processed and recorded for subsequent display as useful information regarding the transaction recorded on the card. FIG. 6 does not show the magnetic transducer used for reading the magnetic stripe, but such transducers and the codes for the magnetic strips are well known.

In operation, the card of the present invention could be used just like a passbook. First the card is read to determine previously recorded information. Next, a user enters his transaction and if validated by an ATM, the ATM then causes data to be written on the first strip by means of the laser. The data represents a passbook entry with a new account status. Operating in this mode, a user may use the card of the present invention in free standing ATMs in isolated locations. While it is necessary for the ATM to make a record of each transaction, there is no need to transmit transaction data using telecommunication links to a CPU at a distant location.

I claim:

1. A data card for use with a card reader-writer comprising,
   - a wallet size card having opposed sides and a length equal to or exceeding a width,
   - a first strip of high resolution reflective direct-read-after-write laser recording material adhered to the card, the reflectivity of said first strip greater than 15%, said first strip being laser recordable in place on said card, and
   - a second strip of magnetic recording material adhered to the card.

2. The card of claim 1 wherein said first and second strips are adhered to the same side of said card.

3. The card of claim 1 wherein said first and second strips are adhered to opposite sides of said card.

4. The card of claim 1 wherein said first and second strips are disposed parallel to each other and spaced apart on the same side of said card, said strips extending in the lengthwise direction.

5. The card of claim 1 wherein said first strip has a minimal laser recording capacity of 250,000 binary bits, each bit being a pit in said laser recording material under 50 microns in size.

6. The card of claim 5 wherein said first strip includes previously recorded data bits represented by pits which are oblong and aligned in paths.

7. The card of claim 6 wherein said pits are arranged in a self-clocking bar code.

8. A data card transaction system comprising,
   - a wallet size card having opposed sides and a length equal to or exceeding a width,
   - a first strip of high resolution reflective direct-read-after-write laser recording material adhered to the card, the reflectivity of said first strip greater than 15%,
   - a second strip of magnetic recording material adhered to the card,
   - a laser disposed in laser data-writing relation with respect to said first strip on said card, and a photodetector disposed in reflective data-read relation with respect to the laser and said first strip on said card, and
   - a magnetic head disposed in magnetic writing relation with respect to said second strip.

9. The system of claim 8 wherein said laser is a semiconductor diode laser.

10. The card of claim 8 wherein said first and second strips are adhered to the same side of said card.

11. The card of claim 8 wherein said first and second strips are adhered to opposite sides of said card.

12. The card of claim 8 wherein said first and second strips are disposed parallel to each other and spaced apart on the same side of said card, said strips extending in the lengthwise direction.

13. The card of claim 8 wherein said first strip has a minimal laser recording capacity of 250,000 binary bits, each bit being a pit in said laser recording material under 50 microns in size.

14. The card of claim 13 wherein said first strip includes previously recorded data bits represented by pits which are oblong and aligned in paths.

* * * * *